(12) United States Patent
Olivier

(10) Patent No.: US 6,692,535 B2
(45) Date of Patent: Feb. 17, 2004

(54) METHOD AND APPARATUS USING TURBINE FLOW METER TO MEASURE FLUID FLOW THERETHROUGH WITHOUT REFERENCE TO VISCOSITY

(76) Inventor: Paul D. Olivier, 15555 N. 79th Pl., Scottsdale, AZ (US) 85260

( * ) Notice: Subject to any disclaimer, the term of this patent is extended or adjusted under 35 U.S.C. 154(b) by 0 days.

(21) Appl. No.: 10/071,636

(22) Filed: Feb. 7, 2002

(65) Prior Publication Data

US 2003/0145662 A1 Aug. 7, 2003

(51) Int. Cl.[7] ................................................ G01F 1/00
(52) U.S. Cl. ........................................... 73/861; 702/45
(58) Field of Search ...................... 73/861.79, 861.65, 73/861.81; 702/45, 50, 99, 100, 132

(56) References Cited

U.S. PATENT DOCUMENTS 5,689,071 A    11/1997 Ruffner et al.
5,831,176 A  * 11/1998 Morgenthale et al. ... 73/861.77
5,880,377 A  *  3/1999 Celik ..................... 73/861.22

* cited by examiner

*Primary Examiner*—Hezron Williams
*Assistant Examiner*—Charlene Dickens
(74) *Attorney, Agent, or Firm*—Frank J. McGue

(57) ABSTRACT

A method and appartus for measuring volumetric flow through a duct without knowing the viscosity of the fluid is provided. A dual rotor turbine volumetric flow meter is operably connected to a duct having fluid flowing therethrough. The dual rotor turbine has a temperature gauge, a first rotor and a second rotor with at least one of said first rotor and said second rotor having a non-linear response to fluid flow. The dual rotor turbine volumetric flow meter is calibrated by deriving a Roshko/Strouhal number curve therefor. During measurement, a first rotor frequency and a second rotor frequency are determined. The second rotor frequency is divided by the first rotor frequency to derive a frequency ratio which is then used to calculate a combined Roshko number. A combined Strouhal number is derived by using the combined Roshko number in conjunction with the Roshko/Strouhal number curve. The volumetric flow rate is calculated using the combined Strouhal number.

19 Claims, 10 Drawing Sheets

US 6,692,535 B2

METHOD AND APPARATUS USING TURBINE FLOW METER TO MEASURE FLUID FLOW THERETHROUGH WITHOUT REFERENCE TO VISCOSITY

TECHNICAL FIELD

This invention relates generally to the field of turbine flow meters, and, more particularly, to a method and apparatus for using volumetric turbine flow meters to measure mass flow through the meter.

BACKGROUND OF THE INVENTION

It is often desireable to use a mass flow rate meter which provides a weight per time period number of flow through a duct for use in certain applications. The term "duct" as used in the present application refers to any tube, conduit, pipe, or the like through which a fluid flows.

One major market for such meters is the aircraft industry which wants to have accurate mass flow rates for its aircraft. This allows an aircraft to load the minimum weight of fuel for given flight including an appropriate safety margin. If an aircraft loads more than that minimum weight, it is essentially burning excess fuel to transport that excess weight to its destination. Thus, there is an incentive to provide accurate mass flow numbers for the aircraft industry as well as other applications.

One method is to use two different flow meters to measure mass flow. In one arrangement, a volumetric flow meter insensitive to density is used in combination with a density sensitive meter which is used to determine the density of the fluid. Once the density is known, a relatively simple calculation using the volume flow rate reading from the volumetric flow meter combined with the density yields the mass flow rate. However, such a combination is subject only to limited number of applications over a narrow range of conditions because one or the other flow meter is also sensitive to a number of secondary variables such as temperature, viscosity, and/or Reynolds number.

Turbine meters are often used as the volumetric flow meter, but such meters are very sensitive to the viscosity, temperature and Reynolds number of the fluid being measured. FIG. 1 shows the classical correlation curve of a standard turbine meter. The illustrated curve graphs the meter frequency divided by the fluid kinematic viscosity is a function of the meter frequency divided by the volumetric flow rate. If a turbine meter is operated at varying temperatures thereby varying the viscosity, the flow rate cannot be determined without knowing that viscosity.

It should be noted that when a turbine meter is operating at a given temperature on a specific fluid, it is not necessary to know the viscosity as long as the turbine meter is calibrated at these same conditions. Those skilled in the art will recognize that such conditions are quite rare in the real world.

In most situations, the temperature will vary which, in turn, causes the viscosity to vary as shown in FIG. 4. This variation does require that the meter system be able to determine the viscosity of a given fluid at a given temperature. Often, this is accomplished by using reference tables which plot viscosity versus temperature for a specific fluid. However, the actual viscosity of any given batch of fluid can vary from the viscosity of another batch of the same fluid sufficiently to negate the value of a reference table as is also shown in FIG. 4.

Other volumetric flow meters can be used in a similar fashion but all suffer from the same deficiency as the turbine flow meter. In addition, many other types of flow meters do not have sufficient accuracy to be competitive with the better mass measuring devices.

With regard to density measurements, there are a number of meter used including differential pressure meters such as orifice plates and target meters which are all sensitive to temperature, viscosity and Reynolds number. In addition, such meters are limited as flow sensitivity is a function of the square root of the differential pressure of force signals generated by the meters.

As a result of the problems using a volumetric flow meter and a density meter combination, most current metering systems employ direct mass flow measuring meters for such measurements. One example of such a meter is a Coriolis meter which tend to be quite expensive. However, when direct mass flow measurement is desired, the user has few choices.

Another direct flow meter employs two turbine elements in tandem wherein one turbine element employs straight turbine blades while the second meter uses a more conventional curved design. The two elements are coupled using a torsional spring. As the mass flow rate increases, the torque reaction causes a phase shift between the two blades. The phase shift is a function of the mass flow rate as long as the rotational speed of the two elements is constant. Several designs are used to maintain the constant rotational speed, including a synchronous motor and a centrifugally loaded vane set. These meters, while commonly used in fuel measurements, are not very accurate and are relatively expensive. Thus, there is a need for a more accurate and less expensive method of measuring mass flow.

The present invention meets this need.

SUMMARY OF THE INVENTION

It is an object of this invention to provide an improved mass flow metering system which is accurate and inexpensive.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 10:
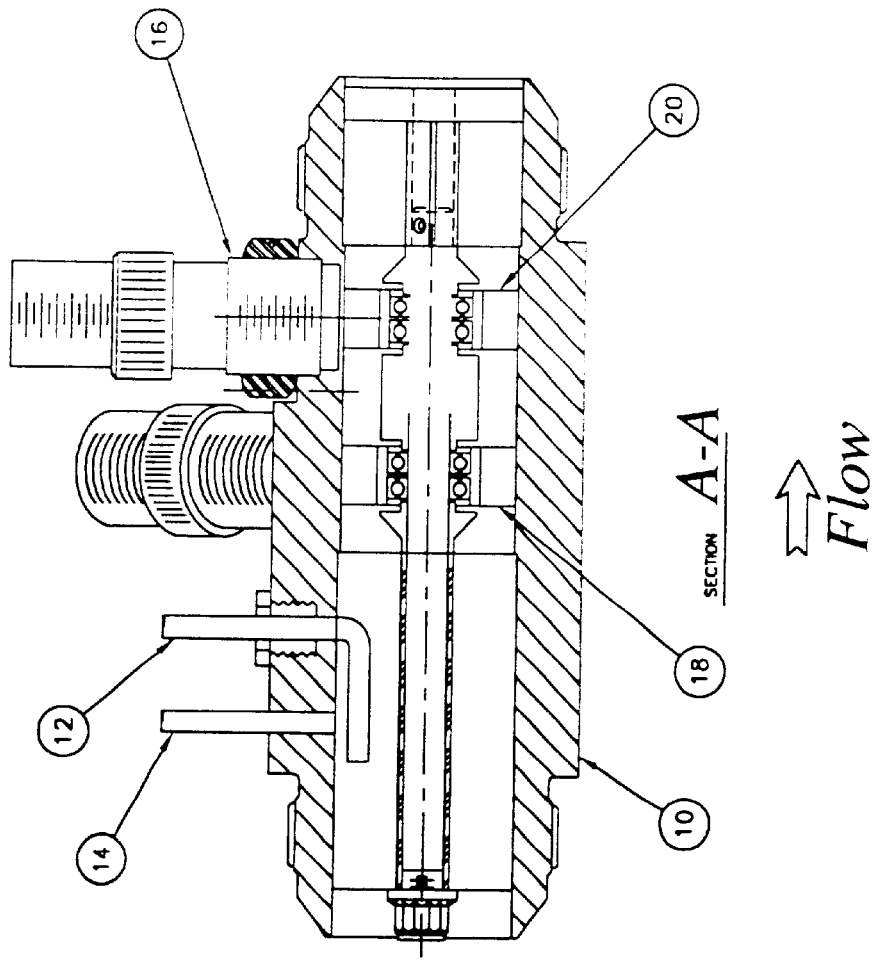
FIG. 10 shows the assembly of a mass flow meter.
Figure 10:
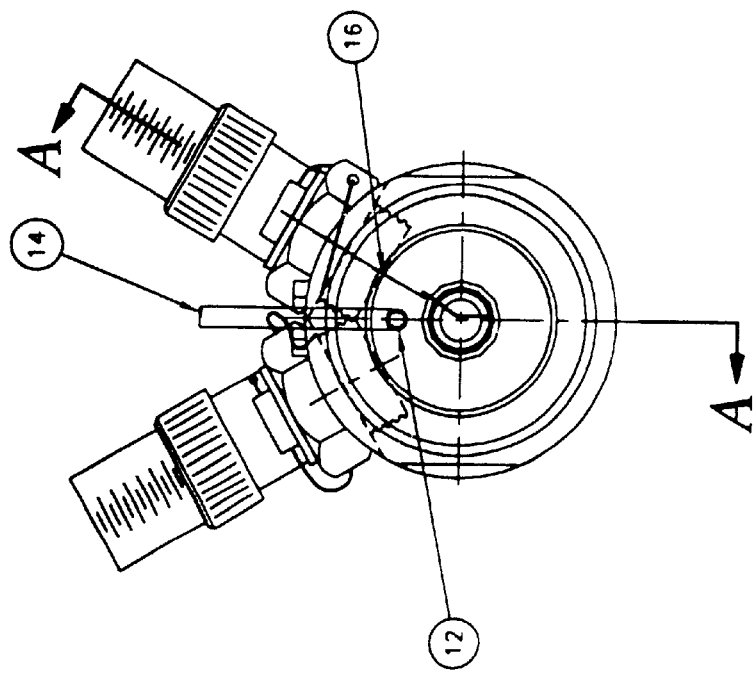

The present invention employs a dual rotor turbine meter 10 described in U.S. Pat. No. 5,689,071 entitled "Wide Range, High Accuracy Flow Meter" which issued on Nov. 18, 1997 to Ruffner and Olivier (the present applicant) which is herein incorporated by reference and is illustrated in FIG. 10. U.S. Pat. No. 5,689,071 describes the operation of two counter rotating hydraulically coupled rotors 18, 20 in a single housing. While operating in many respects like a conventional turbine meter, the patented meter has superior properties in others. Specifically, the operating range is greatly extended. Further, by monitoring the output frequency of both rotors 18, 20, self-diagnostics can be performed.

As described in U.S. Pat. No. 5,689,071, the Roshko Number and the Strouhal Number are used in the calculation of the volumetric flow rate as follows. The Roshko numbers for each rotor are:

$$Ro_1 = f_1/v^*(1+2a(T_{op}-T_{ref}))$$

$$Ro_2 = f_2/v^*(1+2a(T_{op}-T_{ref}))$$

where:

$f_1$ = output frequency of rotor 1 (18)

$f_2$ = output frequency of rotor 2 (20)

v = kinematic viscosity of the fluid at $T_{op}$ a = coefficient of linear expansion of the material making up the body of the meter, for example, 300 series stainless steel $T_{op}$ = operation temperature from a temperature gauge 16 of meter $T_{ref}$ = reference temperature of the meter (may be any convenient temperature).

The Combined Roshko number $Ro_c$ is defined as:

$$Ro_c = (f_1+f_2)/v^*(1+3a(T_{op}-T_{ref}))$$

and the Strouhal numbers for each rotor are:

$$St_1 = f_1/q^*(1+3a(T_{op}-T_{ref}))$$

$$St_2 = f_2/q^*(1+3a(T_{op}-T_{ref}))$$

where:

q = volumetric flow rate and the other terms are as defined previously.

The Combined Strouhal number $St_c$ is defined as follows:

$$St_c = (f_1+f_2)/q^*(1+3a(T_{op}-T_{ref}))$$

or, alternatively, instead of the sum of the frequencies, an average of the frequencies can be employed which is one half the value given above.

Figure 1:
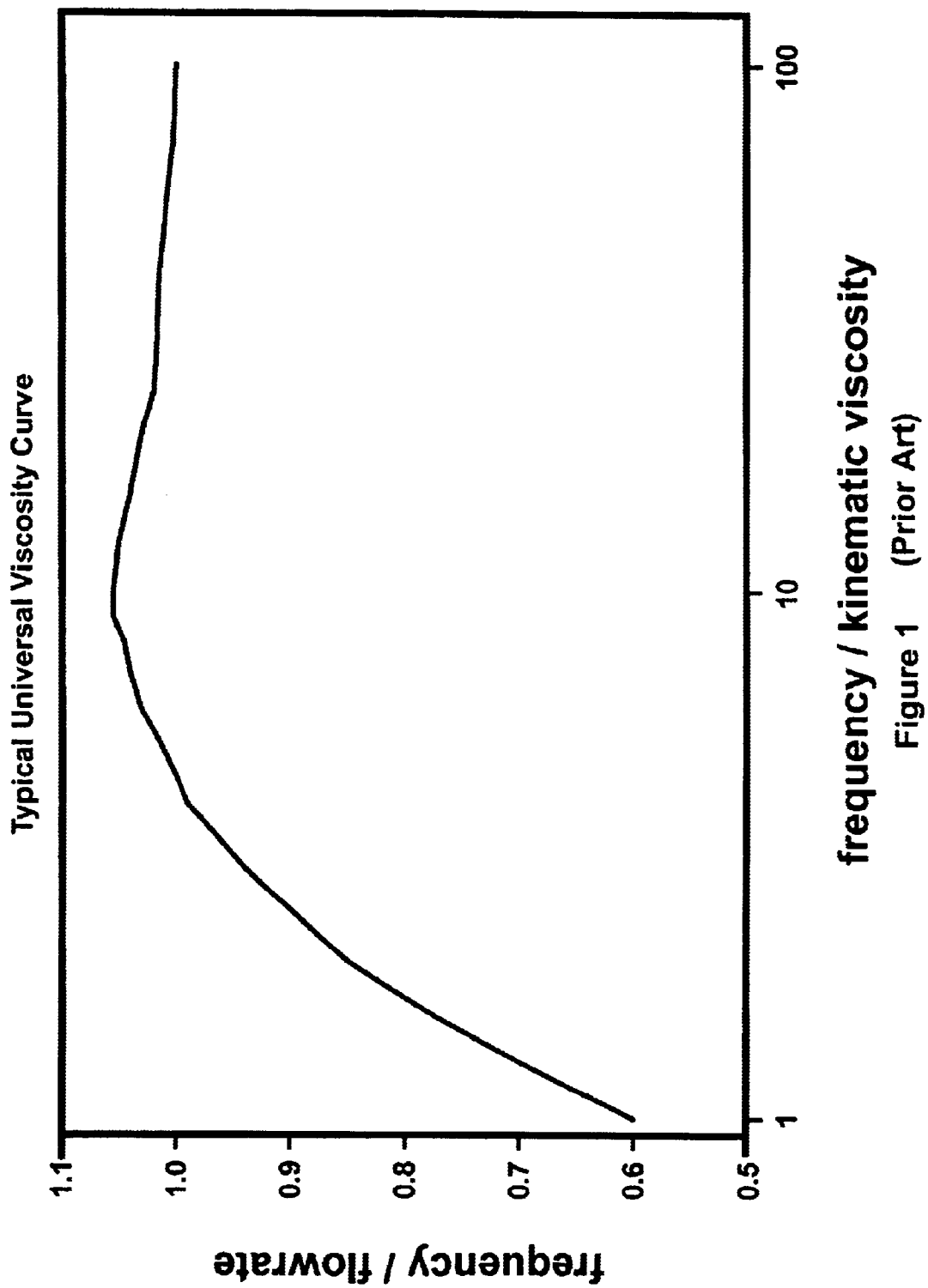
FIG. 1 is a graph showing a typical universal viscosity curve for a turbine meter.
Figure 2:
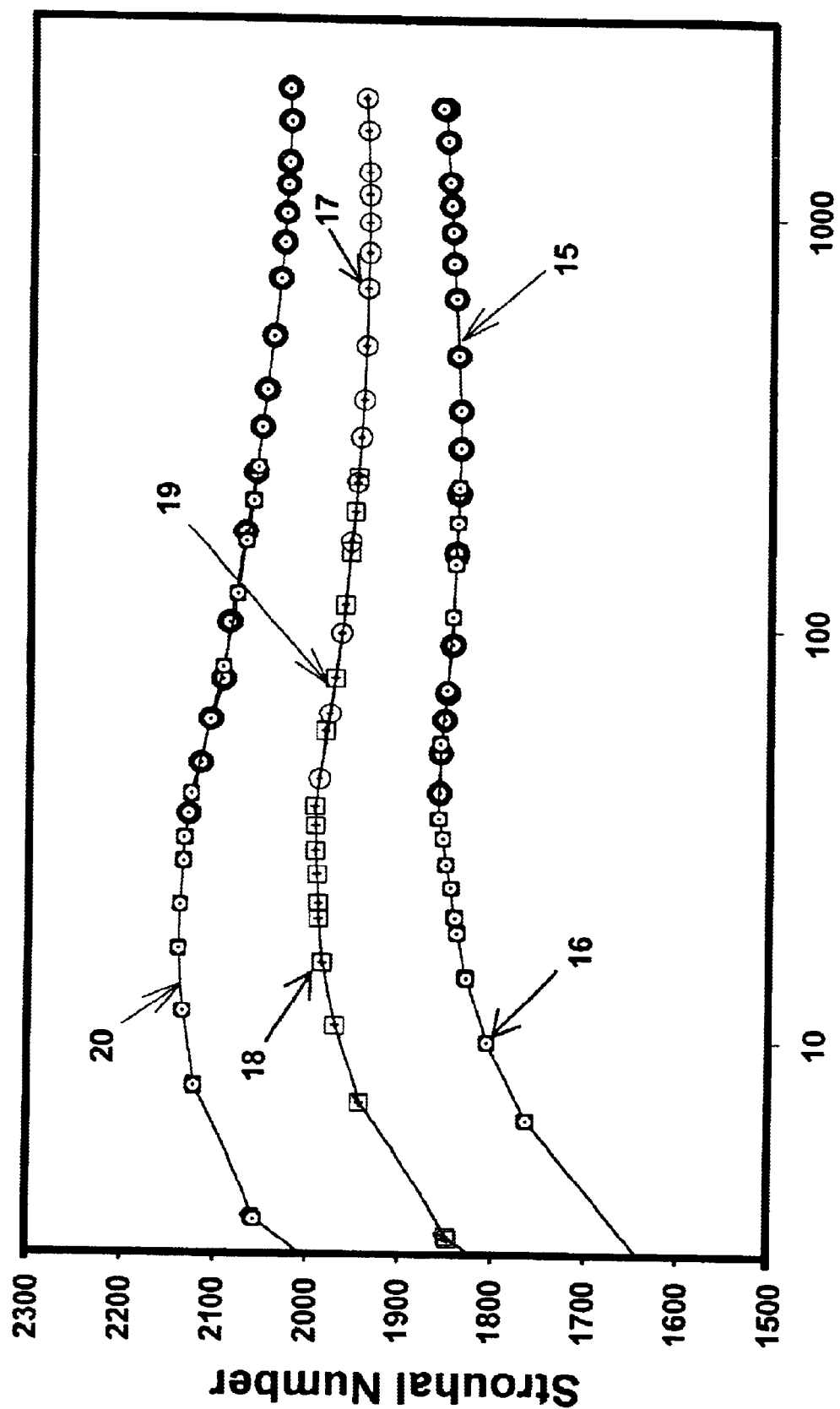
FIG. 2 shows a typical Strouhal Number versus Roshko Number correlation plot for a dual rotor turbine meter.

The relationship between the Strouhal and Roshko numbers is determined during calibration of the meter by deriving a graph such as shown in FIG. 2. As shown in FIG. 2, rotor 1 data taken at 1 centistoke viscosity 15 forms a continuous curve with rotor 1 data taken at 8.3 centistoke viscosity 16 and rotor 2 data at 1 centistoke viscosity 19 forms a continuous curve with rotor 2 data taken at 8.3 centistoke viscosity 20. The average combined rotor 1 and rotor 2 data at 1 centistoke viscosity 17 forms a continuous curve with the combined rotor 1 and rotor 2 data at 8.3 centistoke viscosity 18. When using the meter, the Roshko number is determined by measuring the frequency of a rotor, determining the kinematic viscosity as described in detail below, measuring the operating temperature and then solving the above equation.

Next, the Strouhal number is computed from the calibration curve of FIG. 2. Solving the Strouhal number equations for the volumetric flow rate yields:

$$q = (f_1+f_2)/St_c^*(1+3a(T_{op}-T_{ref}))$$

where:

$St_c$ = combined Strouhal number (or average)

A typical Strouhal number versus Roshko number curve for a two rotor system is shown in FIG. 2 along with a combined Strouhal number ($St_c$) curve. Note that the curves are non-linear with rotor 1 tending to have a declining Strouhal number ($St_1$) as its Roshko number ($Ro_1$) decreases and rotor 2 tending to have an increasing Strouhal number ($St_2$) as its Roshko number ($Ro_2$) increases over most of its range. At lower values, both curves decline. A review shows that there is little or no Roshko number range where either rotor is very linear. However, the combined (average) Strouhal number ($St_c$) is much more linear, at least at the higher Roshko numbers.

It should be noted that it is not possible to directly determine the Roshko number without knowing both the rotor frequencies ($f_1$ and $f_2$) and the operating kinematic viscosity (v) of the fluid. Of course, the rotor frequencies ($f_1$ and $f_2$) are measured and usually the kinematic viscosity (v) of the fluid is predetermined as a function of operating temperature ($T_{op}$). Thus, if the operating temperature ($T_{op}$) is known, the kinematic viscosity (v) is also known.

If the fluid is water, the viscosity versus temperature curve is reliably obtainable from textbooks and other sources. The viscosity values of pure water do not vary much, if at all, from the values in published temperature/viscosity charts.

However, the viscosity versus temperature relationship for other fluids, for example, hydrocarbons including jet fuel and gasoline, should be empirically determined for each batch of fluid used. The viscosity/temperature relationship can vary greatly from one batch to another depending upon such factors as the origin, manufacturer and constituents of each batch. It is quite common for the viscosity of a given fluid to vary as much as ±10% from one batch to another at a constant temperature as shown graphically in FIG. 4 which plots textbook data 25 with upper and lower limits 24. Since the Strouhal number versus Roshko number curve in non-linear, such 10% changes can yield a significant change in the Strouhal number for a given output frequency (f). If the viscosity used in the calculation were in error by this amount, then the calculated volumetric flow rate will also be inaccurate. Thus, such variations often make textbook or published chart numbers 25 impractical sources for the viscosity. However, creating a temperature/viscosity curve for each and every batch of fluid is often impractical or at least very laborious.

Figure 3:
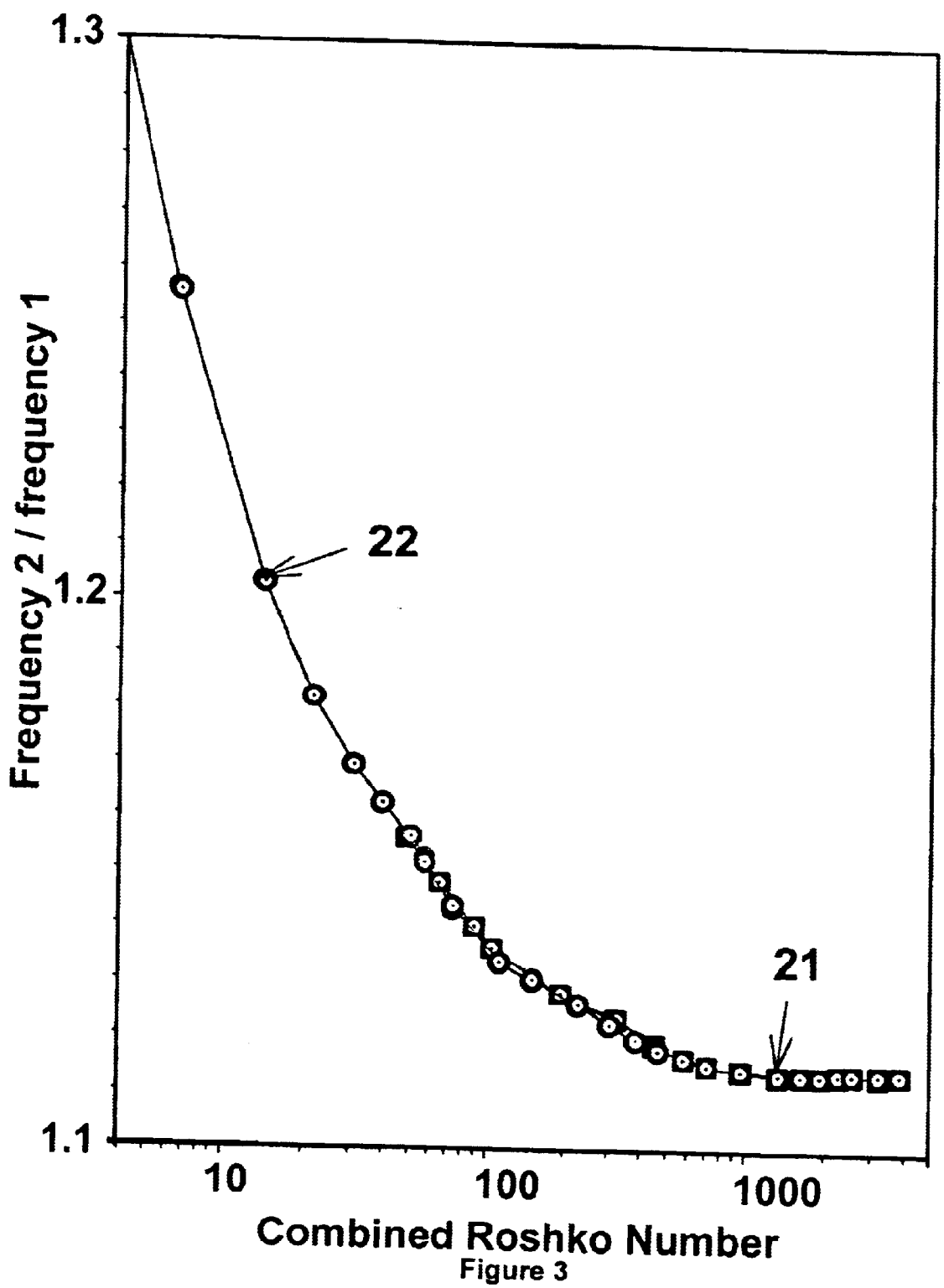
FIG. 3 shows a graph of a dual rotor turbine meter frequency ratio as a function of the Roshko number for an untrimmed rotor.

However, if the frequency ratio ($f_2/f_1$) is considered as a function of the combined Roshko number (averaged number) as shown in FIG. 3, it is shown that at any given value of $Ro_c$, a different frequency ration exists. Then, using FIG. 2, a unique $St_c$ number corresponding to the combined Roshko number ($Ro_c$), can be derived. Thus, for a given volumetric flow rate, the combined frequency ($f_1+f_2$) remains constant as the viscosity changes, but the frequency ratio ($f_2/f_1$) will vary. Conversely, for any given value of the combined frequency ($f_2+f_1$), a unique frequency ratio ($f_2/f_1$) will exist for any value of kinematic viscosity.

Figure 5:
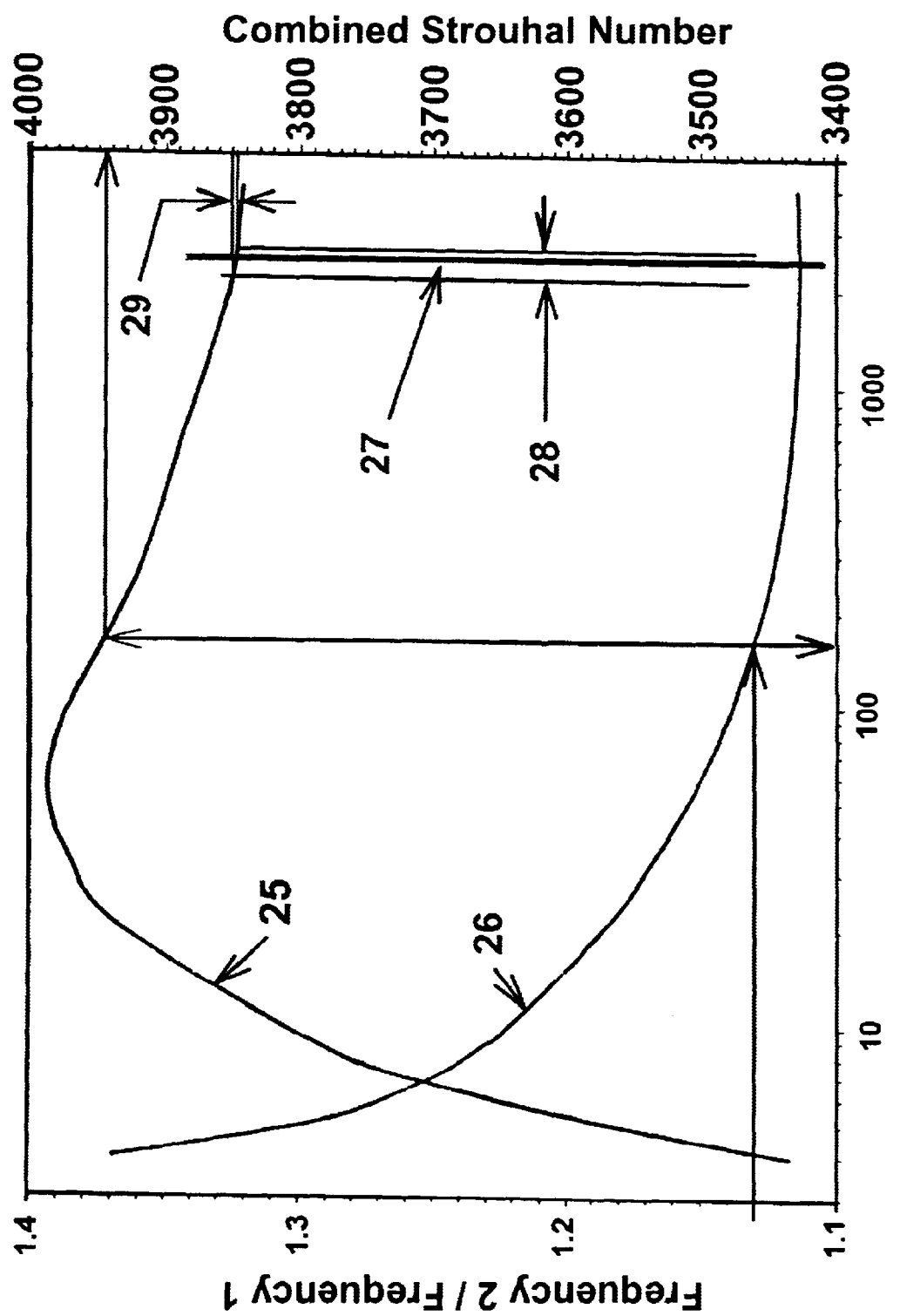
FIG. 5 plots the Strouhal number using a frequency ratio, each as a function of Roshko Number for a dual rotor meter that has not been trimmed.

In conclusion, as best seen in FIG. 5, the use of the two relationships ($f_2+f_1$) and ($f_2/f_1$) eliminates the need to know the kinematic viscosity of the fluid. A close examination of a curve 26 illustrated in FIG. 5 shows that for any combined frequency ($f_2+f_1$), a unique value of combined Strouhal number ($St_c$) exists for any given value of kinematic viscosity. It is also shown that for any given value of frequency ratio ($f_2/f_1$), a unique combined Roshko number ($Ro_c$) also exists. Thus, by simply knowing both frequencies ($f_2$ and $f_1$), these numbers may be obtained without reference to the kinematic viscosity, thereby eliminating the need to pre-determine or measure the kinematic viscosity versus temperature relationship for each batch of fluid.

Those skilled in the art are aware that often turbine meters including the dual rotor turbine meter are designed to have as linear a response as possible. However, in the present invention, a perfectly linear response must be avoided. It will be obvious that the $f_2/f_1$ relationship and the curves derived function only if the individual curves of Strouhal number verses Roshko number shown in FIG. 2 are non-linear.

A best seen in FIG. 5, the curve 26 frequency ratio is flat at the higher Roshko numbers. It is difficult to use this portion of the curve 26 to isolate the operating Roshko number. A technique which uses the frequency sum and the nominal value of the viscosity at the current operating temperature ($T_{op}$) 27 can be used to isolate the band in which the correct Roshko number will fall.

Figure 4:
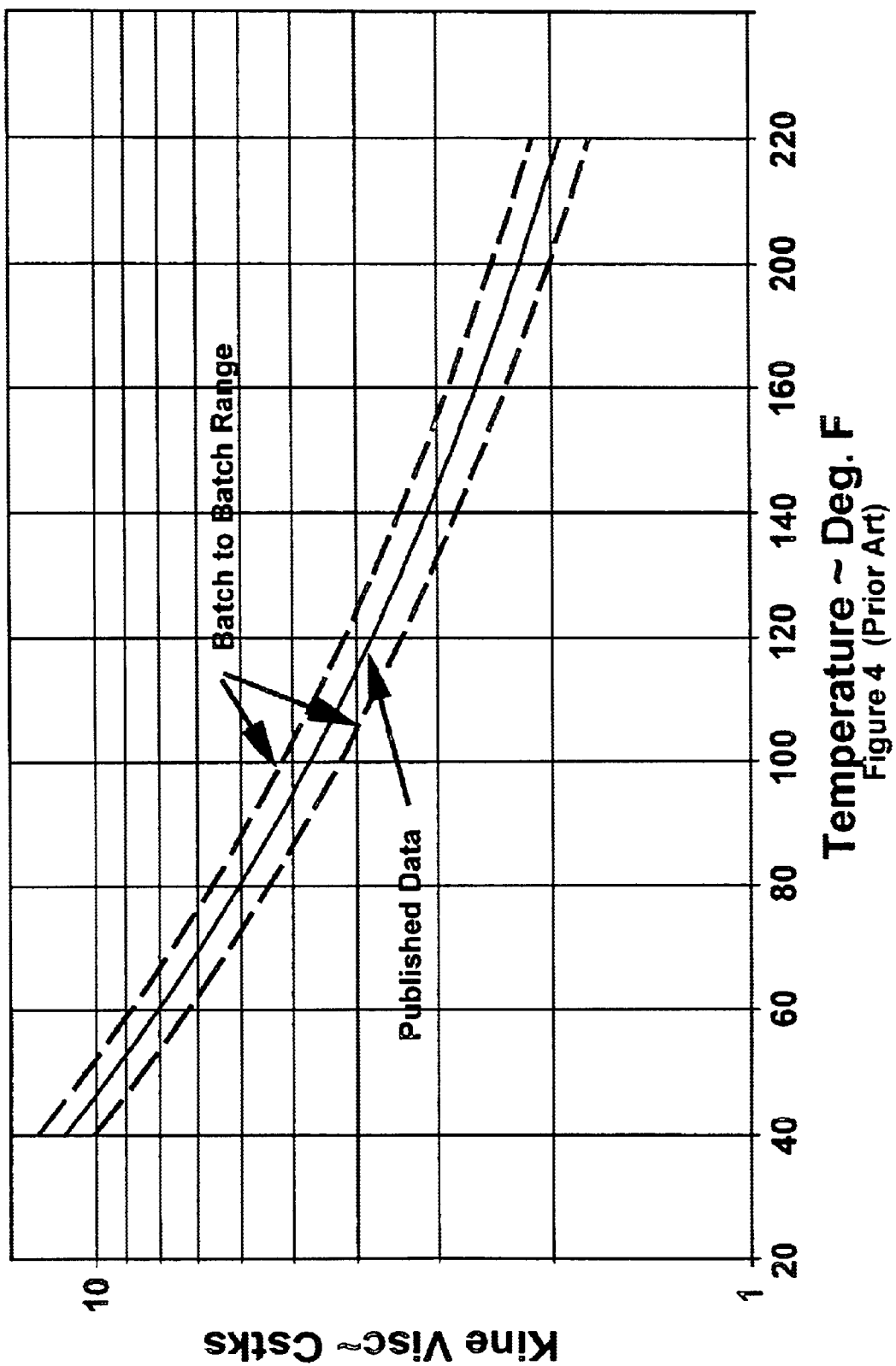
FIG. 4 plots a typical fluid viscosity versus temperature curve.

First, compute the frequency sum ($f_1+f_2$) and use the nominal value of kinematic viscosity at the operating temperature 27 from textbook data 25 similar to FIG. 4 to determine the corresponding Roshko number for that summation. A graph 27 of the results is provided in FIG. 5 as well as an error band 28 showing the potential error arising from this computation. However, since the Strouhal number versus Roshko number is relatively flat in the range where the frequency ratio curve is also flat, the resulting error in Strouhal number is relatively small and acceptable in many cases.

The above computation is more accurate if the individual curves of Strouhal number versus Roshko number and the resulting Roshko number versus frequency ratio are non-linear. Care must be taken in the design of the turbine meter to assure that non-linear characteristics are preserved throughout the range of interest. In the case of the dual rotor turbine meter, this is accomplished by designing at least one of the two rotors to have the value of the frequency ratio change continually as a function of the Roshko number.

However, in many meter designs, it is desireable to have the frequency ratio versus Roshko number curve as linear as possible. If this is the case, the above computation may still be applicable though the user must be aware of the added uncertainty in the values obtained.

Figure 9:
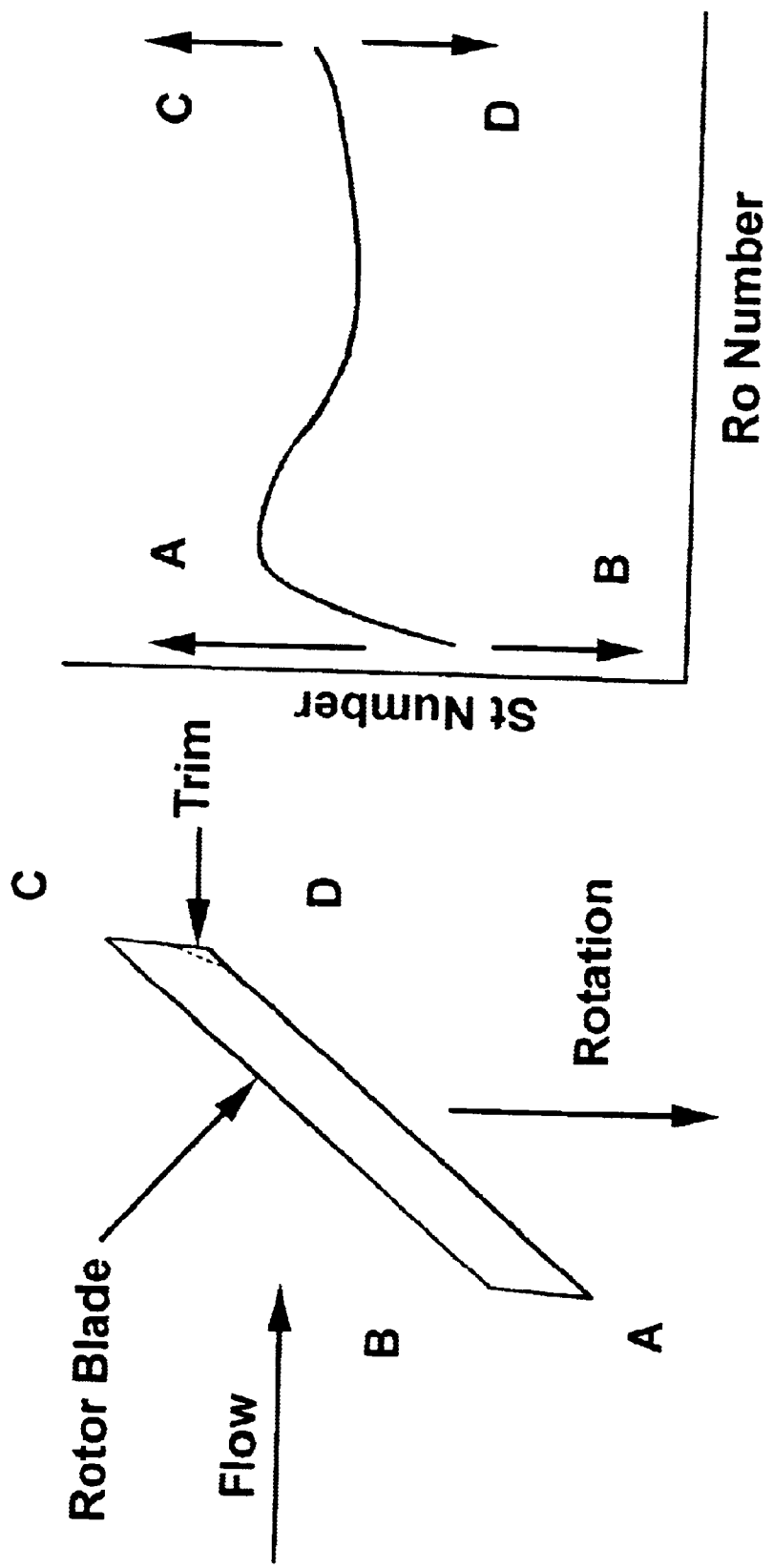
FIG. 9 shows the technique for trimming a rotor.

There are a number of techniques to providing a rotor with a non-linear response, namely, changing the chord, changing the axial length of a rotor or by changing the blade shape. One simple way is shown in FIG. 9 which trims the corners of the rotor blade. If a user wishes to raise the Strouhal number at higher Roshko numbers, trimming a corner C effectively shortens the chord on the pressure side of the blade thereby producing the desired effect.

Figure 6:
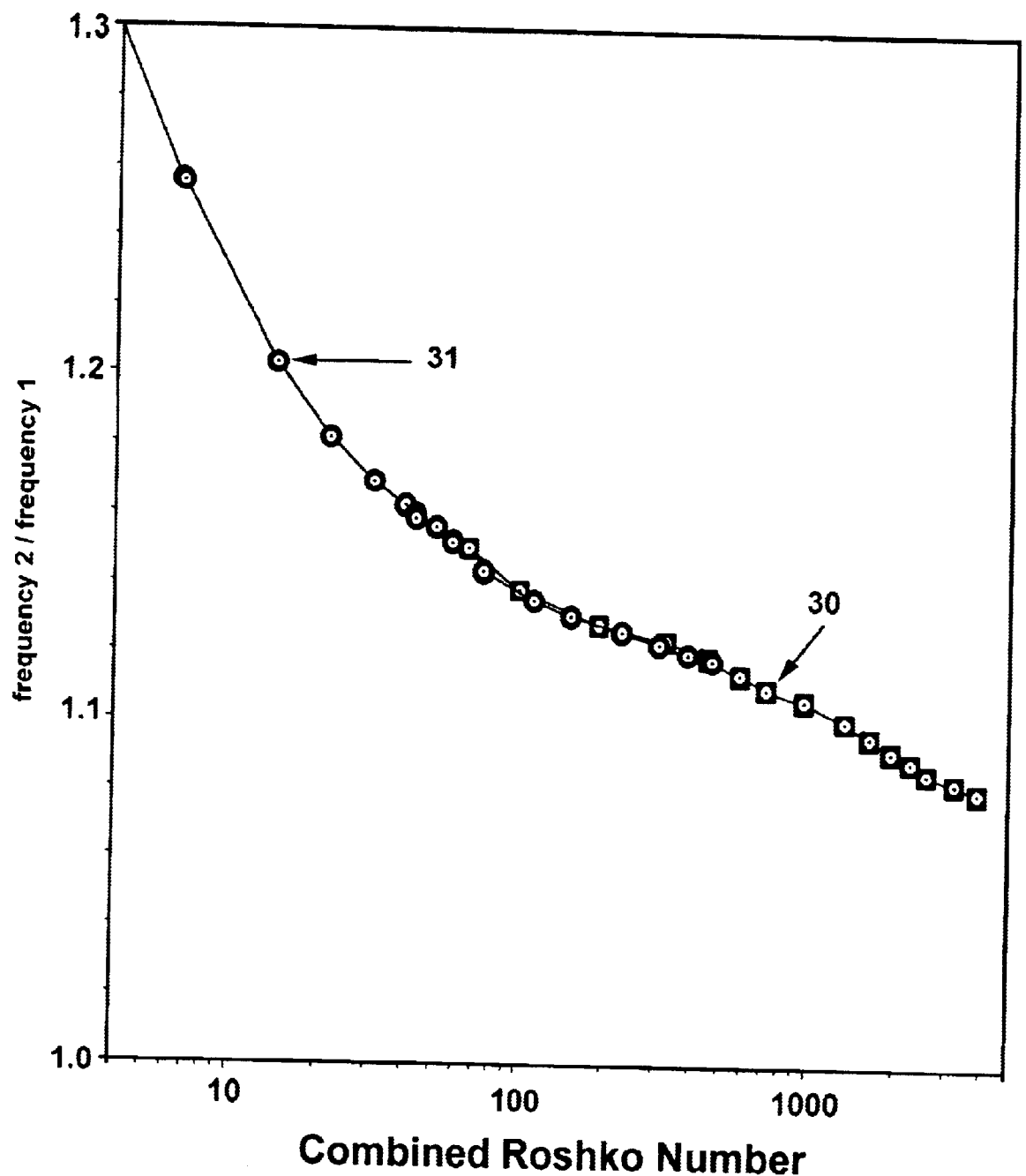
FIG. 6 plots the dual rotor turbine meter frequency ratio as a function of the Roshko number for a meter that has been adjusted to a non-linear relationship.
Figure 7:
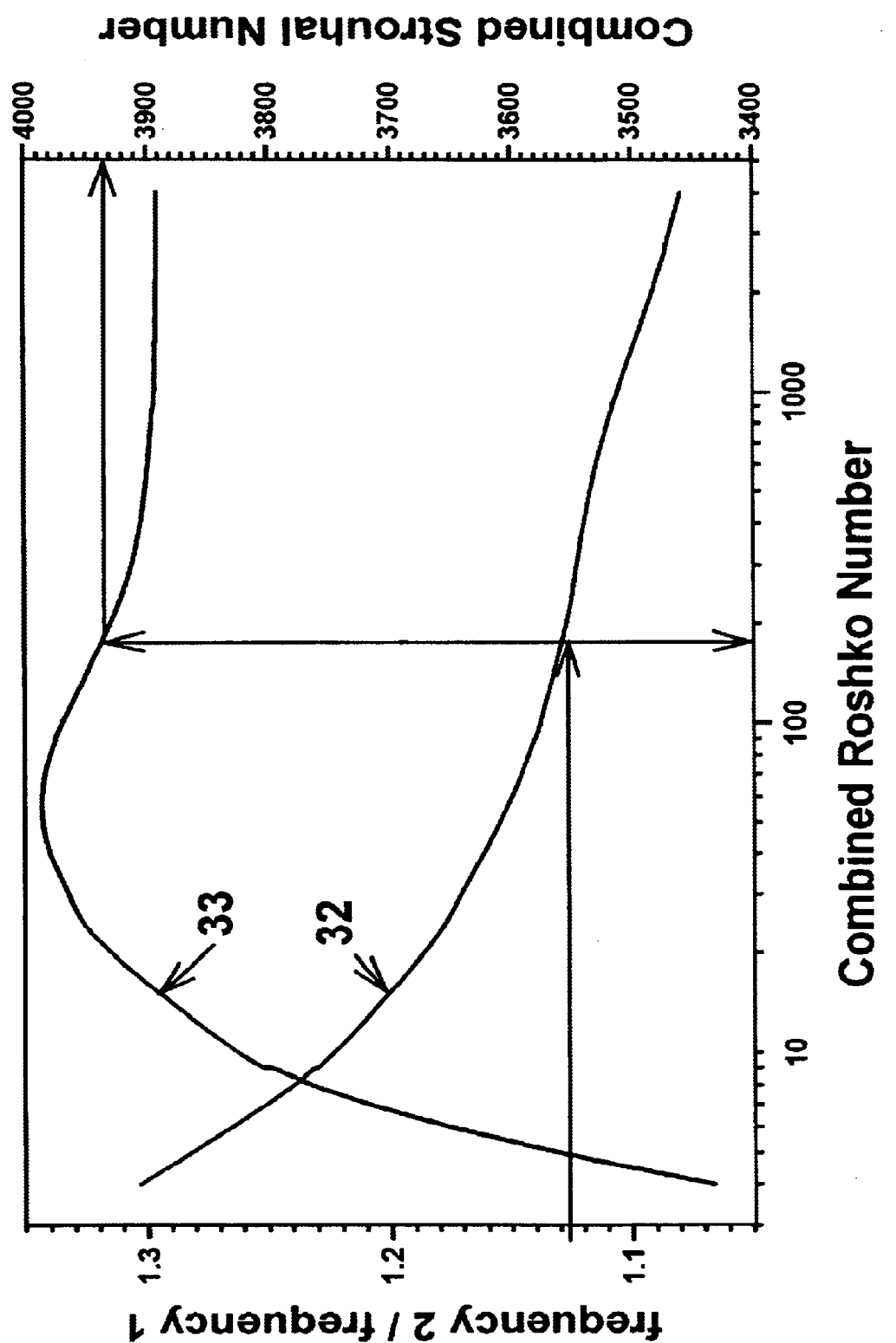
FIG. 7 plots Strouhal number using frequency ratio for the adjusted non-linear meter, each as a function of the Roshko Number for a dual rotor meter that has been trimmed to be non-linear.

The results of trimming the first rotor are shown in FIGS. 6 and 7. As can be observed, the entire plot has a usable slope over the entire range since 1 centistoke viscosity points 30 form a continuous curve with 8.3 centistoke viscosity points 31 and it is no longer necessary to calculate the results by determining the viscosity of the fluid. Thus, the meter is now totally insensitive to viscosity because the Roshko-number can be determined without reference thereto as shown in FIG. 7 where the frequency ratio versus Roshko Number curve 32 leads directly to the Strouhal Number in curve 33, again without reference to viscosity. Note that calibration and verification of the meter can be done by actually verifying the operating viscosity and comparing the results to the nominal values to avoid large errors entering the system from momentary invalid readings.

It will also be obvious to those skilled in the art that considerable mathematical calculations are required to practice this method. While hand calculations are certainly possible, the use of a computer or microprocessor makes this solution quite practical and relatively inexpensive.

It will be apparent to those skilled in the art that the above minimizes the variation in volumetric measurements due to secondary variables, i.e., the temperature, viscosity and Reynolds number. The reduction in variation makes it practical to consider use of the dual rotor meter in combination with a density sensor to determine the mass flow rate through a duct such as a fuel supply line. It is noted that dual rotor turbine meters are generally insensitive to pressure variations. Thus, the use of a which measures differential pressures to determine the density is a good choice as it avoids cross sensitivities between the two meters.

There are a number of meters which use differential pressures, including, but not limited to, measuring the differential pressure across an orifice, across a blunt body, across a rotor, with a pitot tube or using a wall static method. A target meter could similarly be used.

However, measuring flow rates with a target meter, or by using an orifice, or across a blunt body and across rotors are all sensitive to Reynolds numbers and fluid density. Since the kinematic viscosity is assumed to be unknown (although it can be mathematically determined) in the dual rotor meter discussed previously, using such methods essentially defeats the purpose of same, namely, the elimination of viscosity as a variable.

Thus, one preferred method of computing density is the use of a pitot tube and wall static. FIG. 10 shows a dual rotor meter 10 with a pitot tube 12 and wall static 14 installed. As is well known in the art, pitot tube 12 is used to calculate the velocity of the fluid as:

$$V=[(Pt-Ps)/\rho]^{1/2}$$

where:
  V=fluid velocity at the point of Pt measurement
  Pt=total pressure
  Ps=wall static pressure
  $\rho$=operating fluid density or conversely stated:

$$\rho=(Pt-Ps)/V^2$$

The density will change with temperature, but the differential pressure will change proportionally. Thus, the operating density is determined independently of other variables. At this point, the dual rotor turbine meter has determined the volumetric flow rate and the pitot tube/wall static have isolated the density, both independently of secondary variables. Further, the average velocity in the duct is computed as:

$$V_{avg}=q/A$$

where:

A = cross sectional area of the duct.

The velocity measured by the pitot tube is local or point velocity while the velocity computed from the flow rate is an average velocity. A proportionality constant K is added to the equations to handle this difference and thus the density equation is modified as follows:

$$\rho = K^*(Pt-Ps)/V^2$$

The proportionality constant K may actually vary somewhat with $V_{avg}$ or q but is easily determined at calibration. The density equation is restated as:

$$\rho = (Pt-Ps)/(V^2_{avg}/K)$$

and the mass flow rate is:

$$M = q^*\rho$$

To summarize, the use of the present method which measures only rotor frequencies $f_1$ and $f_2$ in combination with a pitot tube and wall static differential pressure is ideally suited for determining a mass flow rate through a duct.

One of the major advantages for use of a dual rotor turbine meter is the wide operating range, or turndown, of such meters. However, one of the major disadvantages of the pitot tube/wall static port is the small operating range of same. As shown above, the velocity measured in a pitot tube is a function of the square root of the differential pressure and density. Thus, for a 16:1 change in differential pressure, only a 4:1 change in flow rate is achieved. Since pressure transducers are normally rated as a percentage of full scale, a 16:1 ratio is generally all that can be tolerated. Note that there are methods to extend this limit, such as stacked differential pressure devices, or simply accepting a reduced accuracy in an extended range. However, another solution is also possible with particular application to hydrocarbon fluids such as jet fuel.

As noted previously, the density versus temperature curve for most hydrocarbon fluids changes significantly from one batch to another. In most applications, the batch of fluid on which the meter is employed is changed periodically. However, once operation of the system is limited to a particular batch of fluid, the change in density is a simple function of temperature (and pressure to a lesser degree in high pressure applications).

As an example, consider the application in a fuel supply line in a jet aircraft. The engine is started and operated at idle, usually a very low flow rate. The engine is then accelerated to near maximum at takeoff for a relatively short period of time. Once airborne, the engine is throttled back to a cruise flow rate which is maintained for a long period of time, relatively speaking. This cruise flow rate is well within the 4:1 range of maximum flow rate. During descent and landing, the flow rate is reduced again to a lower value for a short time, and then returns to idle before shutdown. The total amount of fuel used during the idle and landing times is very small compared to the takeoff and cruise periods. Note that this scenario also applies to a number of other applications.

Figure 8:
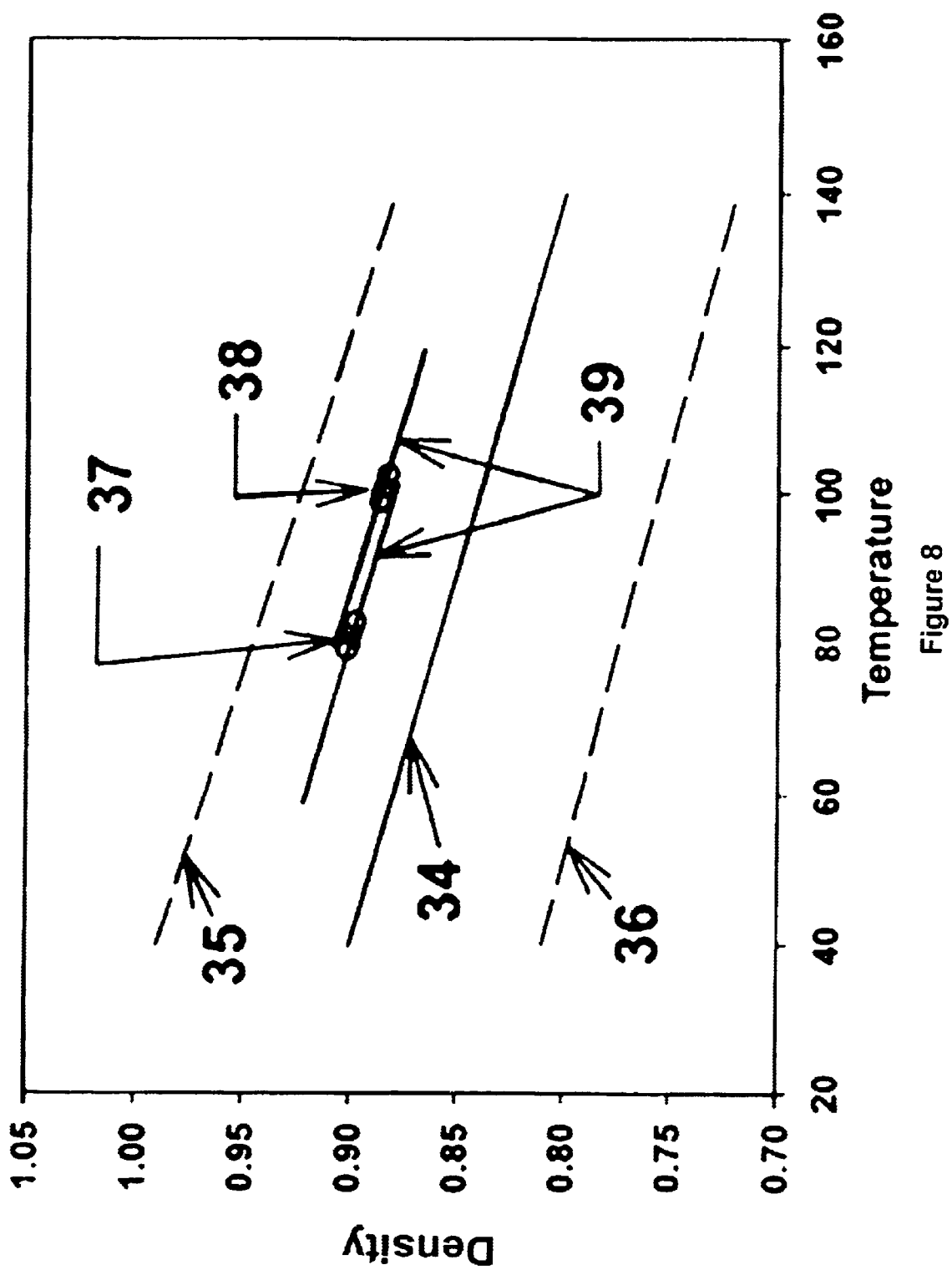
FIG. 8 is a graph demonstrating fluid density versus temperature with a normal upper and a normal lower limit.

A density versus temperature curve 34 for a typical hydrocarbon fluid is shown in FIG. 8. Over a normal operating range, the density change can be linearly approximated as temperature changes. Also seen in FIG. 8 are batch to batch limits 35, 36 for a typical hydrocarbon fluid. A temperature versus density curve 39 for any given batch of hydrocarbon fluid is parallel to the typical curve 34 but offset from same by some small quantity. Thus, once a single density/temperature point is determined for a specific batch of hydrocarbon fluid, the temperature/density curve 39 can be extrapolated from same to cover the expected operating range. Other subsequent measurements of density at other temperatures can be combined to create a composite curve 38 of the entire operating cycle as the flow rate and temperature achieve the operating condition.

Thus, at flow rates outside the optimum range for a pitot tube, the density measurement may be extrapolated from previously obtained data. The density data for a particular batch of fluid is maintained and accumulates, subject to data storage limitations, until a new batch arrives. Once a new batch arrives, the data is purged and new data added to allow for accurate extrapolation outside the operating range of the pitot tube. Until enough data is accumulated to make an accurate extrapolation, textbook averages can be used as temperature/density measurements.

FIG. 8 show the typical accumulation of density data during the operation of the system. A running average, standard deviation computation or other form of limiting the very large number of data points may be used if needed to keep the data from overwhelming the processor. Each time a new batch of fluid is used the data buffer is reset and new data accumulated. For an initial startup, or after a reset, textbook or nominal data for a particular fluid is used until sufficient data is accumulated to more precisely determine the true curve of density versus temperature for that new batch.

With this method of density determination, the current operating temperature is actually used to determine the density from the defined curve. The measured density points are used only to continually define the temperature versus density curve.

Although only certain embodiments have been illustrated and described, it will be apparent to those skilled in the art that various changes and modifications may be made therein without departing from the spirit of the invention or from the scope of the appended claims.

What is claimed is:

1. A method of measuring volumetric flow through a duct without knowing the viscosity of the fluid, the method comprising the steps of:

providing a dual rotor turbine volumetric flow meter connected to a duct having fluid flowing therethrough, the dual rotor turbine having a temperature gauge, a first rotor and a second rotor, at least one of said first rotor and said second rotor having a non-linear response to fluid flow, calibrating the dual rotor turbine volumetric flow meter by deriving a Roshko/Strouhal number curve therefor, determining a first rotor frequency and a second rotor frequency, dividing the second rotor frequency by the first rotor frequency to derive a frequency ratio, calculating a combined Roshko number using the frequency ratio, determining a combined Strouhal number using the combined Roshko number and the combined Roshko/Strouhal number curve, calculating the volumetric flow rate using the combined Strouhal number.

2. The method of claim 1 wherein the volumetric flow rate is calculated using the equation $q=(f_1+f_2)/St_c^*(1+3a(T_{op}-T_{ref}))$, where q is the volumetric flow rate, $St_c$ is the combined Strouhal number, $f_1$ is the first rotor frequency, $f_2$ is the second rotor frequency, a = coefficient of linear expansion, $T_{op}$=operating temperature of the meter and $T_{ref}$=reference temperature of the meter.

3. The method of claim 1 wherein the combined Roshko number is calculated using the equation $Ro_c=(f_1+f_2)/v^*(1+3a(T_{op}-T_{ref}))$.

4. A method of calculating a mass flow through a duct, the method comprising the steps of:

providing a dual rotor turbine volumetric flow meter connected to a duct having fluid flowing therethrough, the dual rotor turbine having a temperature gauge, a first rotor and a second rotor, at least one of said first rotor and said second rotor having a non-linear response to fluid flow, calibrating the dual rotor turbine volumetric flow meter by deriving a Roshko/Strouhal number curve therefor, determining a first rotor frequency and a second rotor frequency, dividing the second rotor frequency by the first rotor frequency to derive a frequency ratio, calculating a combined Roshko number using the frequency ratio, determining a combined Strouhal number using the combined Roshko number and the Roshko/Strouhal number curve, calculating the volumetric flow rate using the combined Strouhal number, providing a density meter connected to the duct, the density meter determining the density of the fluid, multiplying the density by the volumetric flow rate to calculate the mass flow moving through the duct.

5. The method of claim 4 wherein the volumentric flow rate is calculated using the equation $q=(f_1+f_2)/St_c^*(1+3a(T_{op}-T_{ref}))$, where q is the volumetric flow rate, $St_c$ is the combined Strouhal number, $f_1$ is the first rotor frequency, $f_2$ is the second rotor frequency, a=coefficient of linear expansion, $T_{op}$=operating temperature read by the temperature gauge and $T_{ref}$=reference temperature of the meter.

6. The method of claim 4 wherein the combined Roshko number is calculated using the equation $Ro_c=(f_1+f_2)/v^*(1+3a(T_{op}-T_{ref}))$.

7. The method of claim 4 wherein the mass flow is calculated using the equation $M=q^*\rho$ where M=mass flow, q=volumetric flow rate and $\rho$=density.

8. The method of claim 4 wherein the density meter uses differential pressures to determine the density.

9. The method of claim 8 wherein the density meter is a combination of a pitot tube and wall static pressure measurements.

10. The method of claim 9 wherein the density meter determines the density using the equation $\rho=(Pt-Ps)/(V^2_{avg}/K)$ wherein $\rho$=fluid density, Pt=total pressure, Ps=wall static pressure, K=a proportionality constant, and $V_{avg}=q/A$ where q=volumetric flow rate and A=cross sectional area of the duct.

11. The method of claim 10 further comprising the steps of deriving a temperature versus density curve for the fluid, reading a fluid temperature reading from the temperature gauge, extrapolating a density from the temperature reading and the temperature versus density curve.

12. An apparatus for calculating a mass flow through a duct, the apparatus comprising:

a dual rotor turbine volumetric flow meter connected to a duct having fluid flowing therethrough, the dual rotor turbine having a temperature gauge, a first rotor and a second rotor, at least one of said first rotor and said second rotor having a non-linear response to fluid flow, the dual rotor turbine volumetric flow meter adapted to be calibrated with a Roshko/Strouhal number curve therefor, the first rotor having a first frequency and the second rotor having a second frequency, means for calculating a frequency ratio by dividing the first rotor frequency by the second rotor frequency, means for calculating a combined Roshko number using the frequency ratio, means for calculating a combined Strouhal number by using the combined Roshko number and the Roshko/Strouhal number curve, means for calculating the volumetric flow rate by using the combined Strouhal number, a density meter connected to the duct, the density meter determining the density of the fluid, means for calculating the mass flow moving through the duct by multiplying the density by the volumetric flow rate.

13. The apparatus of claim 12 wherein the means for calculating the volumentric flow rate uses the equation $q=(f_1+f_2)/St_c^*(1+3a(T_{op}-T_{ref}))$, where q is the volumetric flow rate, $S_c$ is the combined Strouhal number, $f_1$ is the first rotor frequency, $f_2$ is the second rotor frequency, a=coefficient of linear expansion, $T_{op}$=operating temperature read by the temperature gauge and $T_{ref}$=reference temperature of the meter.

14. The apparatus of claim 12 wherein the combined Roshko number is calculated using the equation $Ro_c=(f_1+f_2)/v^*(1+3a(T_{op}-T_{ref}))$.

15. The apparatus of claim 12 wherein the means for calculating the mass flow uses the equation $M=q^*\rho$ where M=mass flow, q=volumetric flow rate and $\rho$=density.

16. The apparatus of claim 12 wherein the density meter uses differential pressures to determine the density.

17. The apparatus of claim 16 wherein the density meter is a combination of a pitot tube and wall static pressure measurements.

18. The apparatus of claim 17 wherein the density meter determines the density using the equation $\rho=(Pt-Ps)/(V^2_{avg}/K)$ wherein $\rho$=fluid density, Pt=total pressure, Ps=wall static pressure, K=a proportionality constant, and $V_{avg}=q/A$ where q=volumetric flow rate and A=cross sectional area of the duct.

19. The apparatus of claim 18 further comprising the steps of deriving a temperature versus density curve for the fluid, reading a fluid temperature reading from the temperature gauge, extrapolating a density from the temperature reading and the temperature versus density curve.

* * * * *